April 1, 1952 H. C. SAVINO 2,591,617

AUTOMATIC TELEMETERING SYSTEM

Filed Oct. 4, 1947 8 Sheets-Sheet 1

INVENTOR
HENRY C. SAVINO
BY
William A. Zalesak
ATTORNEY

April 1, 1952 H. C. SAVINO 2,591,617

AUTOMATIC TELEMETERING SYSTEM

Filed Oct. 4, 1947 8 Sheets-Sheet 2

INVENTOR
HENRY C. SAVINO
BY
William A. Zalesak
ATTORNEY

April 1, 1952

H. C. SAVINO 2,591,617

AUTOMATIC TELEMETERING SYSTEM

Filed Oct. 4, 1947

8 Sheets-Sheet 3

INVENTOR
HENRY C. SAVINO
BY
William A. Zalesak
ATTORNEY

April 1, 1952 H. C. SAVINO 2,591,617

AUTOMATIC TELEMETERING SYSTEM

Filed Oct. 4, 1947 8 Sheets-Sheet 4

INVENTOR
HENRY C. SAVINO
BY
William A. Zalesak
ATTORNEY

INVENTOR
HENRY C. SAVINO
BY
William A. Zalesak
ATTORNEY

April 1, 1952 H. C. SAVINO 2,591,617

AUTOMATIC TELEMETERING SYSTEM

Filed Oct. 4, 1947 8 Sheets-Sheet 6

INVENTOR.
HENRY C. SAVINO

BY William A. Zalesak
ATTORNEY

INVENTOR.
HENRY C. SAVINO

BY
William A. Zalesak
ATTORNEY

April 1, 1952 H. C. SAVINO 2,591,617

AUTOMATIC TELEMETERING SYSTEM

Filed Oct. 4, 1947 8 Sheets-Sheet 8

INVENTOR.
HENRY C. SAVINO
BY
William A. Zalesak
ATTORNEY

Patented Apr. 1, 1952

2,591,617

UNITED STATES PATENT OFFICE 2,591,617

AUTOMATIC TELEMETERING SYSTEM

Henry C. Savino, Jersey City, N. J.

Application October 4, 1947, Serial No. 777,999

13 Claims. (Cl. 177—351)

Figure 1:
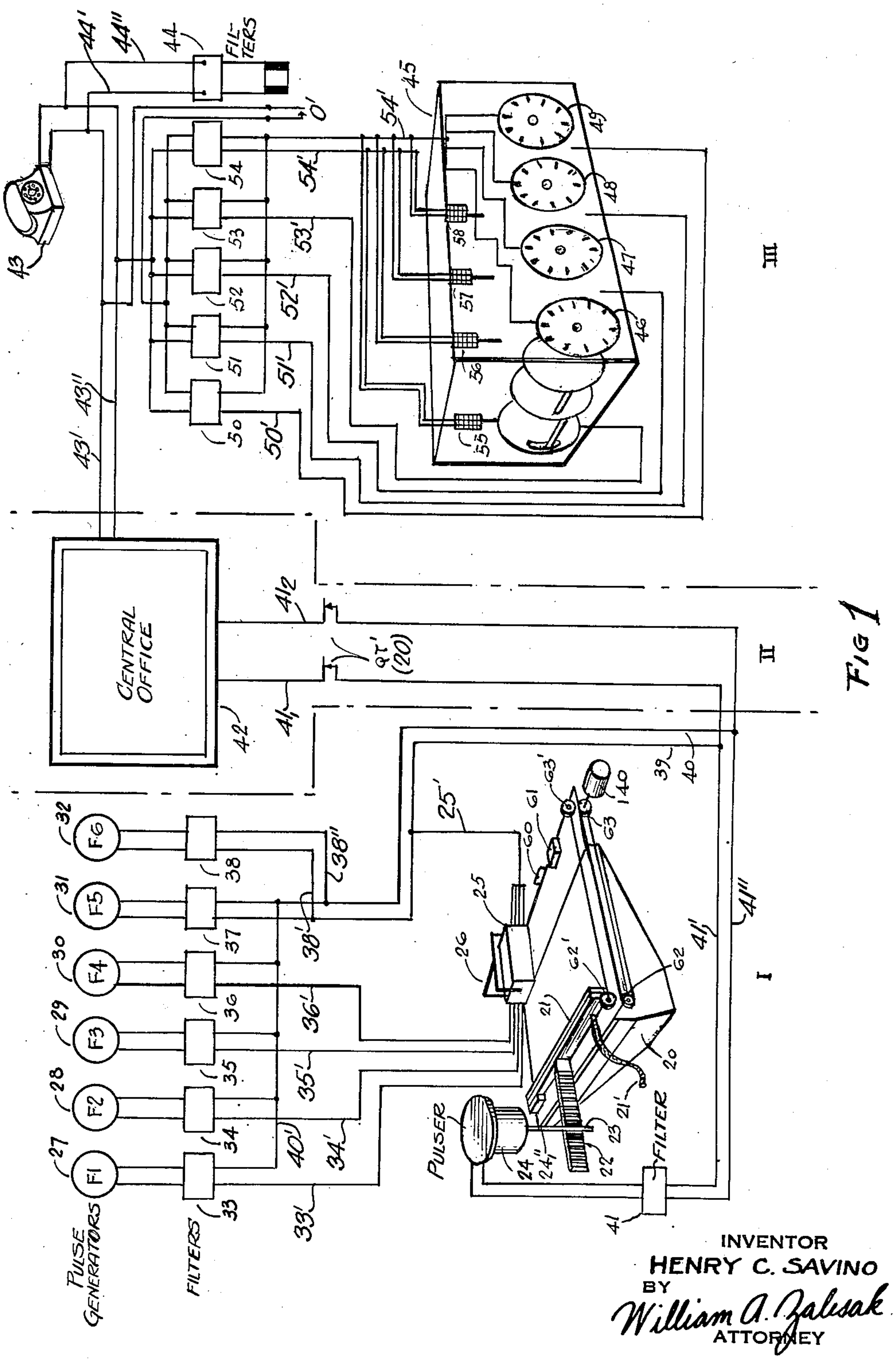

My invention relates to an automatic telemetering system comprising a system of devices for reading meters and related apparatus a distance from a main office automatically by means of existing telephone circuits and automatically recording the readings.

The primary purpose of the present invention is to provide a system and apparatus for recording at a main office the reading of a meter at a remote point.

More specifically, the present invention relates to an apparatus for reading at a main office the indications of a meter or a plurality of meters located at outlying points. The apparatus is electrically actuated in order to obtain high speed of operation and it is provided with electric coding and recording mechanisms whereby the successive readings may be recorded on a tape or the like.

One of the objects of the invention is the provision of a method of and apparatus for reading meters at a distance by using telephone circuits in conjunction with local transmitting equipment and suitable receiving equipment at the distant main office.

Another object is the provision of a system of control whereby signals indicating the readings of meters and the like can be transmitted over standard telephone circuits, whether manually or automatically operated, without either affecting the operation of the automatic telephone equipment, or giving undesired signals to the telephone operator in the exchange, or otherwise interfering with normal operation of the telephone system.

Another object is the provision of a system and apparatus for indicating the reading of numerous meters at a distance from the meters through one set of transmitting equipment.

Another object is the provision of means for reading meters at a distance which is simple in operation, relatively rapid, and relatively inexpensive when compared with previously proposed systems.

Another object of my invention is to record the meter readings automatically on cards prepared for this purpose at the central office.

A further object of my invention is to eject such cards automatically when the line is busy so that the meters may be automatically read and recorded when the card is reinserted at a later period.

A further object of my invention is to provide a means whereby the meter readings may be recorded automatically upon a tape, said apparatus including means for automatically passing over and later returning the tape to a predetermined position for recording if a busy signal is obtained.

A further object of my invention is to provide such a system and apparatus which will automatically reset and successively read and record other customers' meter reading.

Another object of my invention is to provide a novel automatic dialing and recording device for telemetering systems.

A still further object of my invention is to provide a novel and improved telemetering system.

A still further object is to provide improved automatic means for locally reading the dials at a meter and sending this intelligence back to the main office for recording.

These and other objects will appear hereinafter.

With my invention to be described, it is possible to automatically record meter readings by means of existing telephone circuits upon either a telephone subscriber's premises or a non-subscriber's premises.

Figures 2, 3, 4, 5, 6, 7:
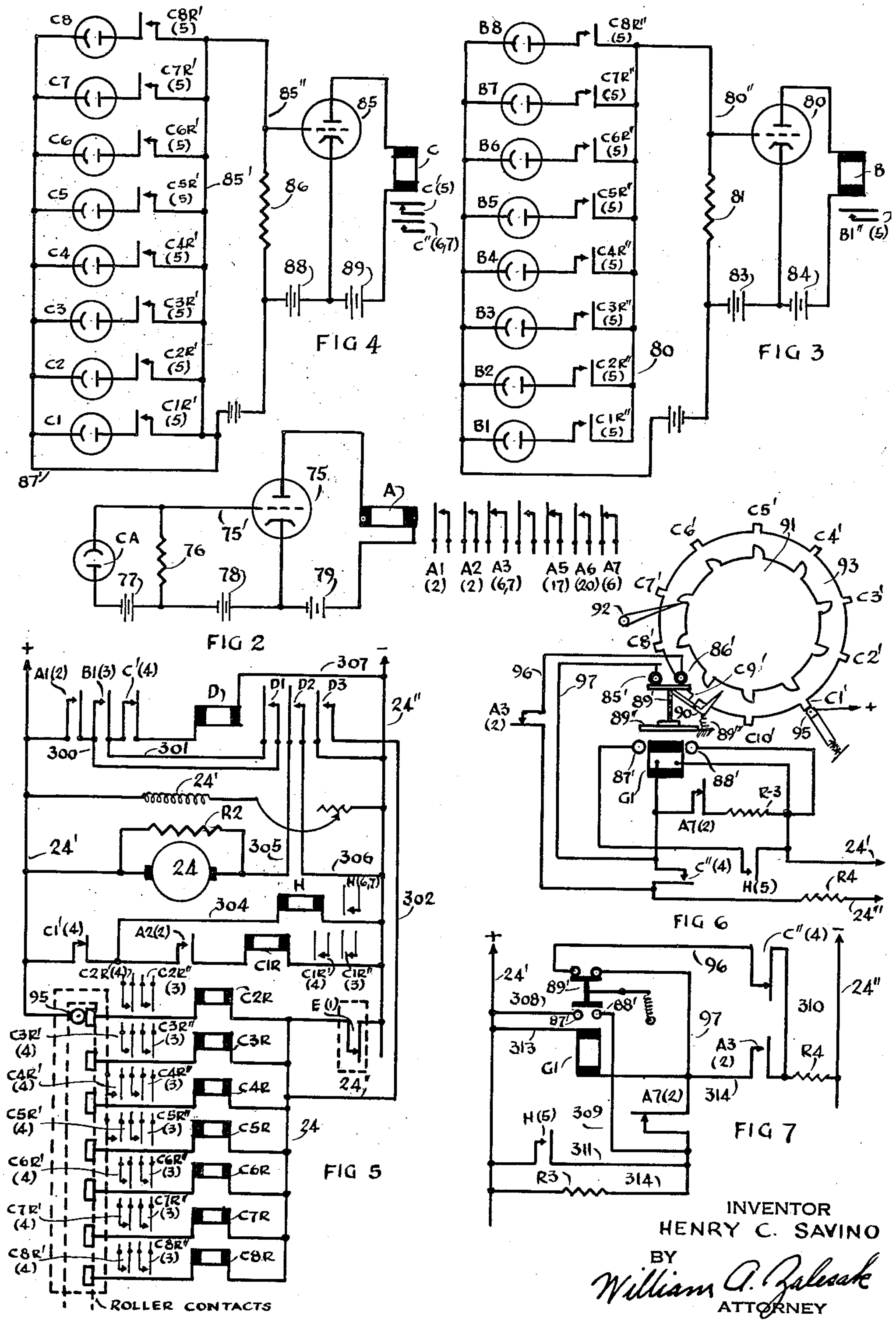
Figure 8:
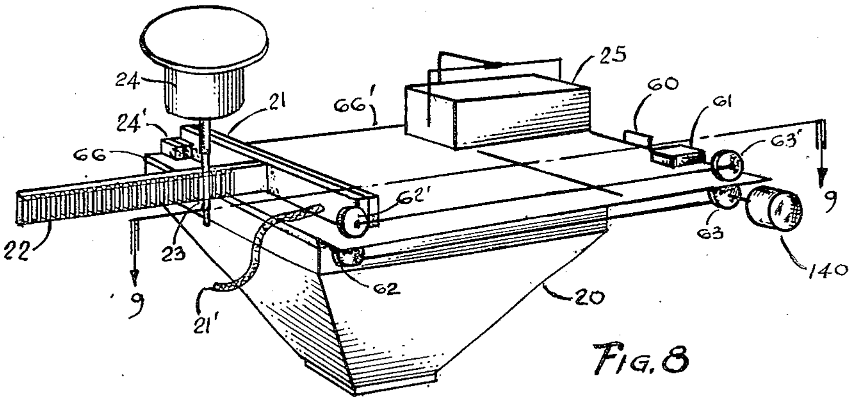
Figures 9, 11, 12:
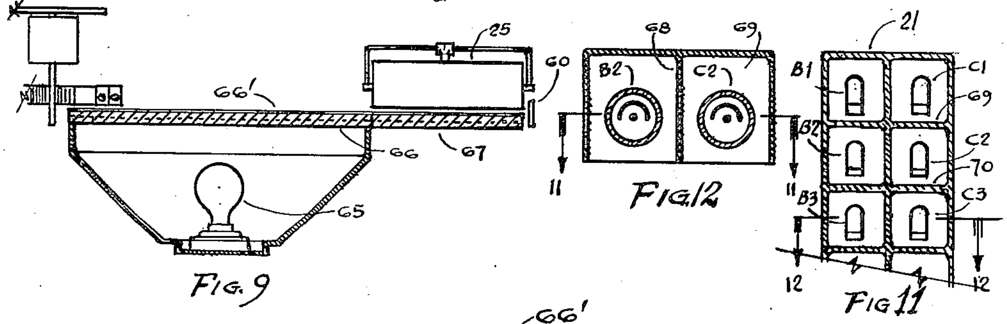
Figure 10:
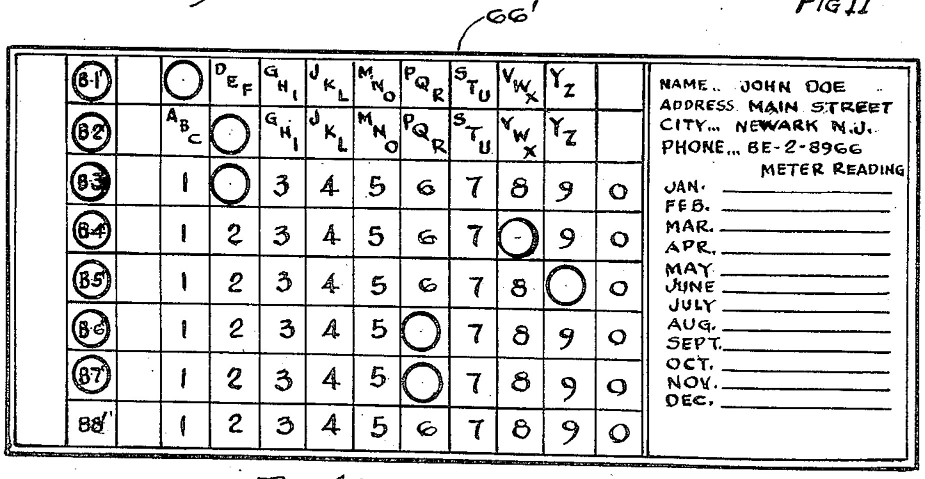
Figures 13, 14, 15:
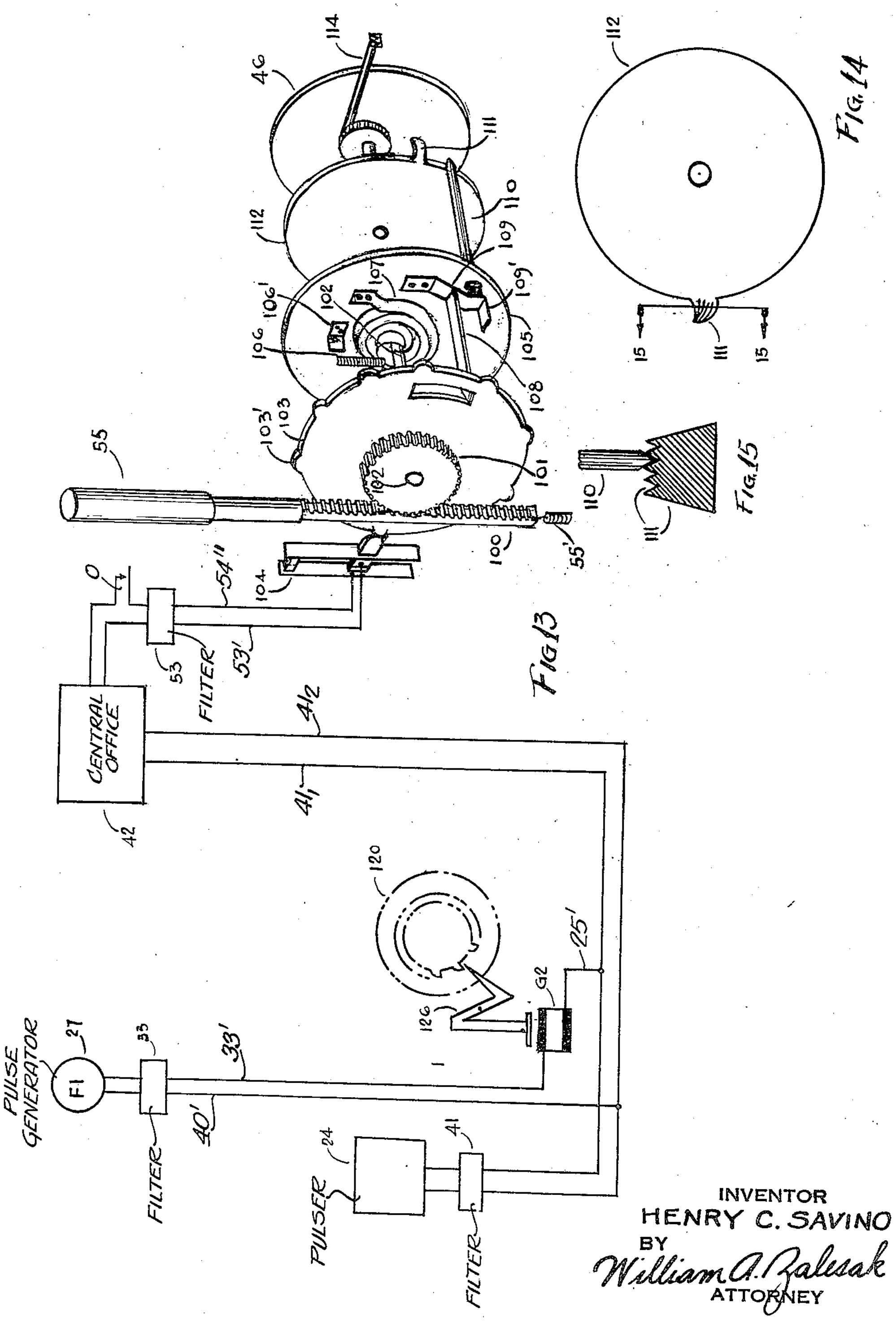
Figure 17:
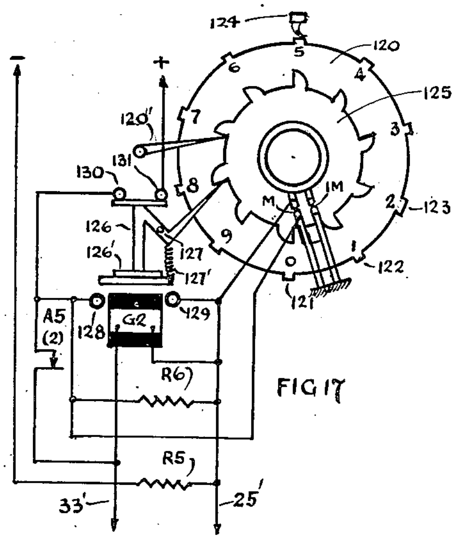
Figure 16:
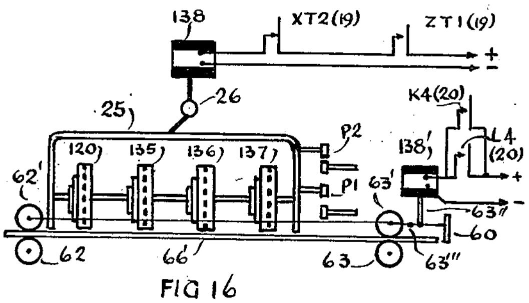
Figure 18:
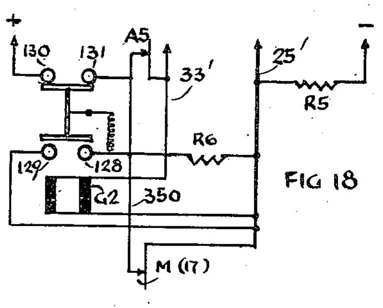
Figure 20:
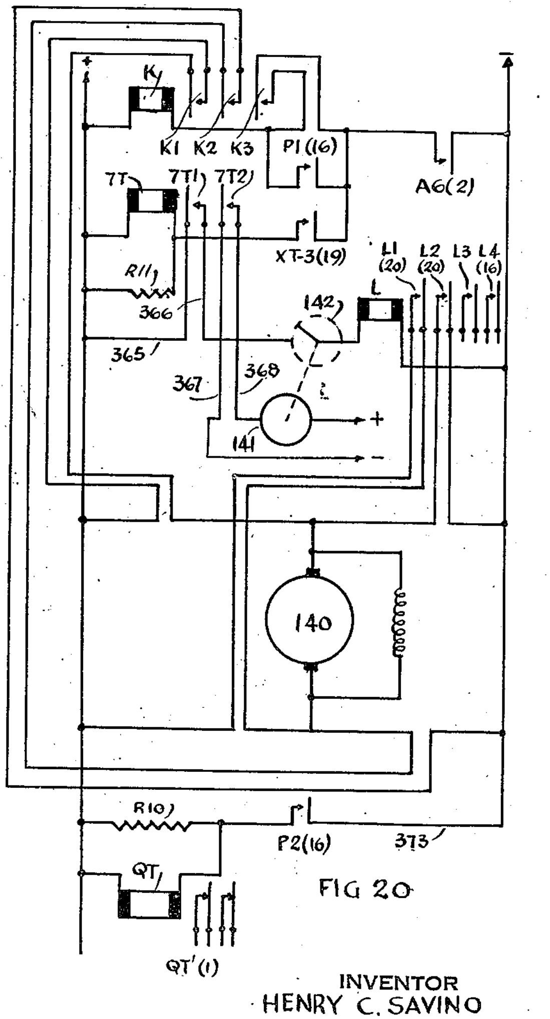
Figure 19:
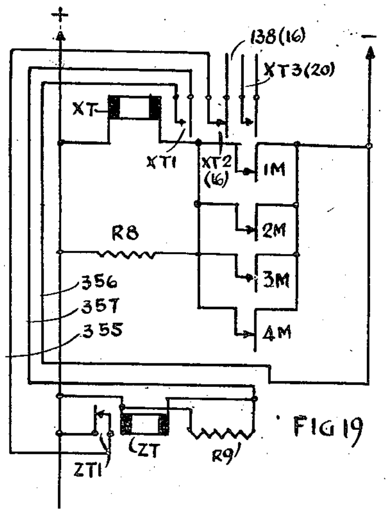
Figures 21, 22, 23:
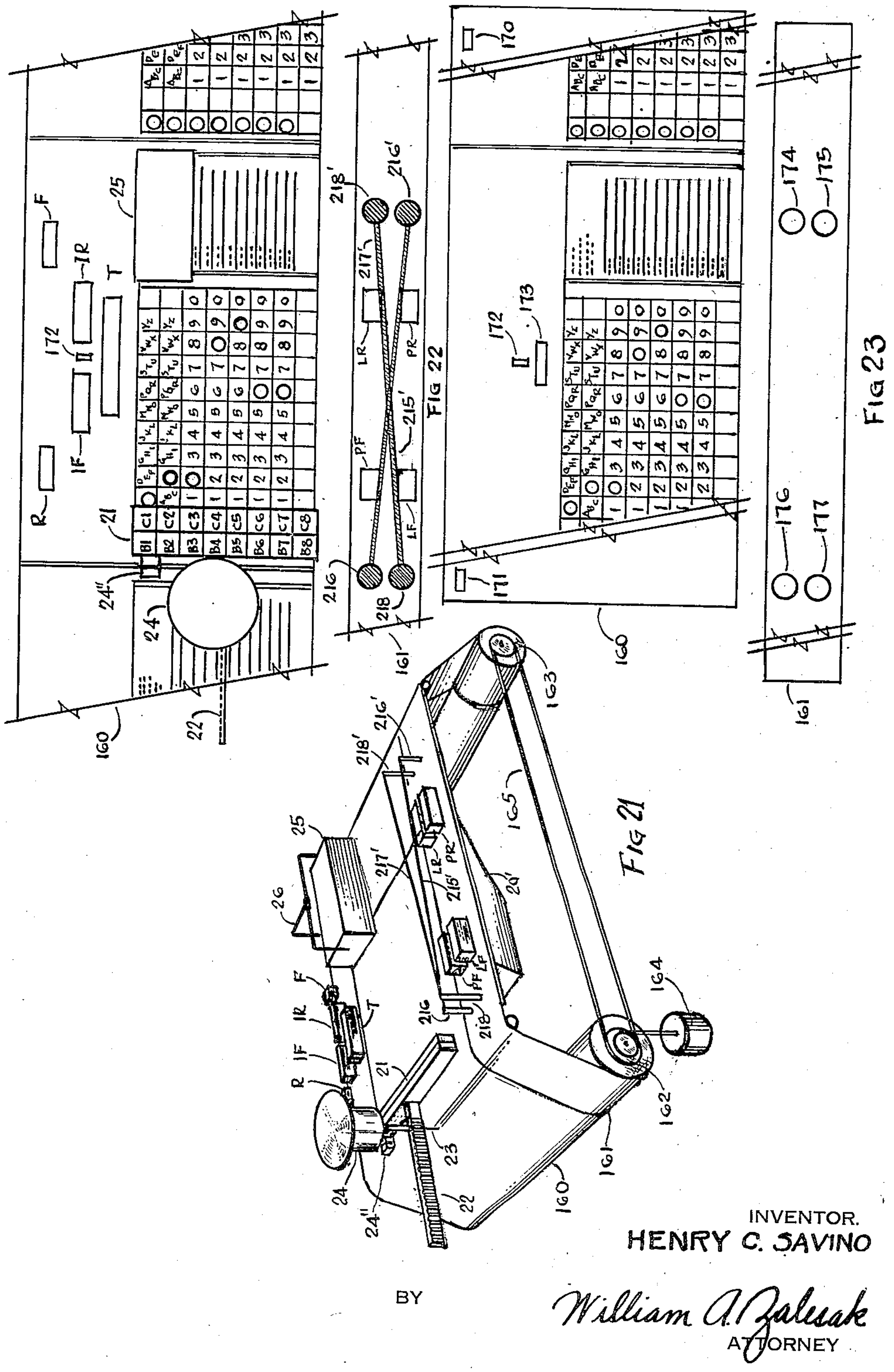
Figure 24:
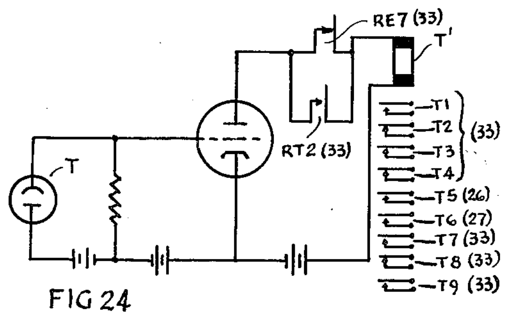
Figure 25:
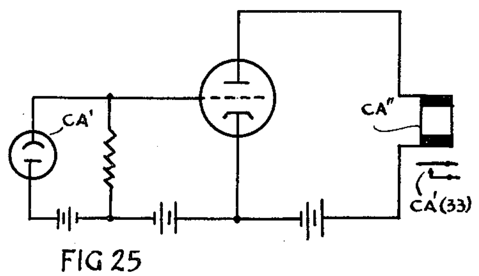
Figure 26:
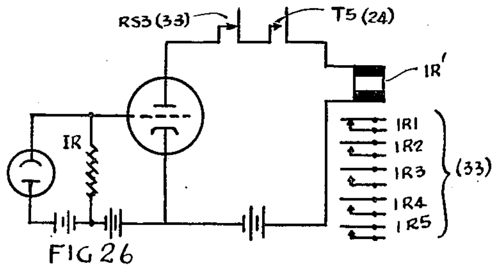
Figure 27:
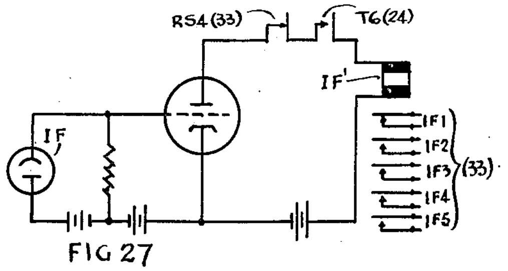
Figure 28:
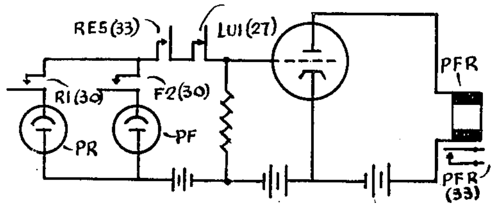
Figure 29:
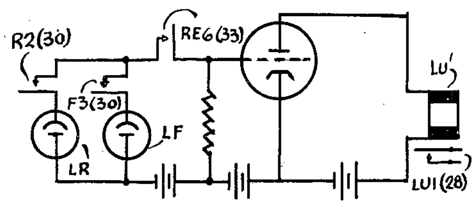
Figure 30:
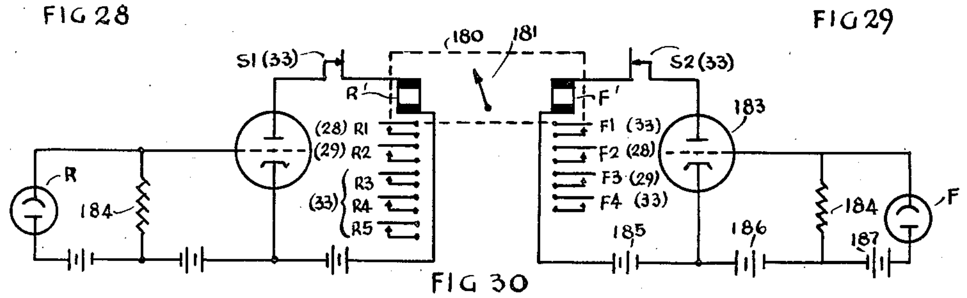
Figure 31:
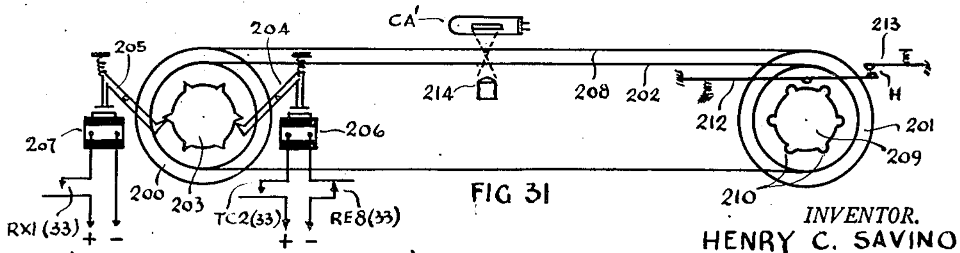
Figure 32:
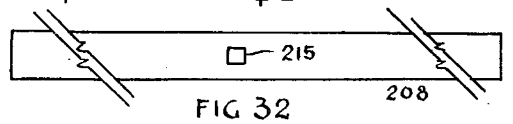
Figures 33, 34, 35:
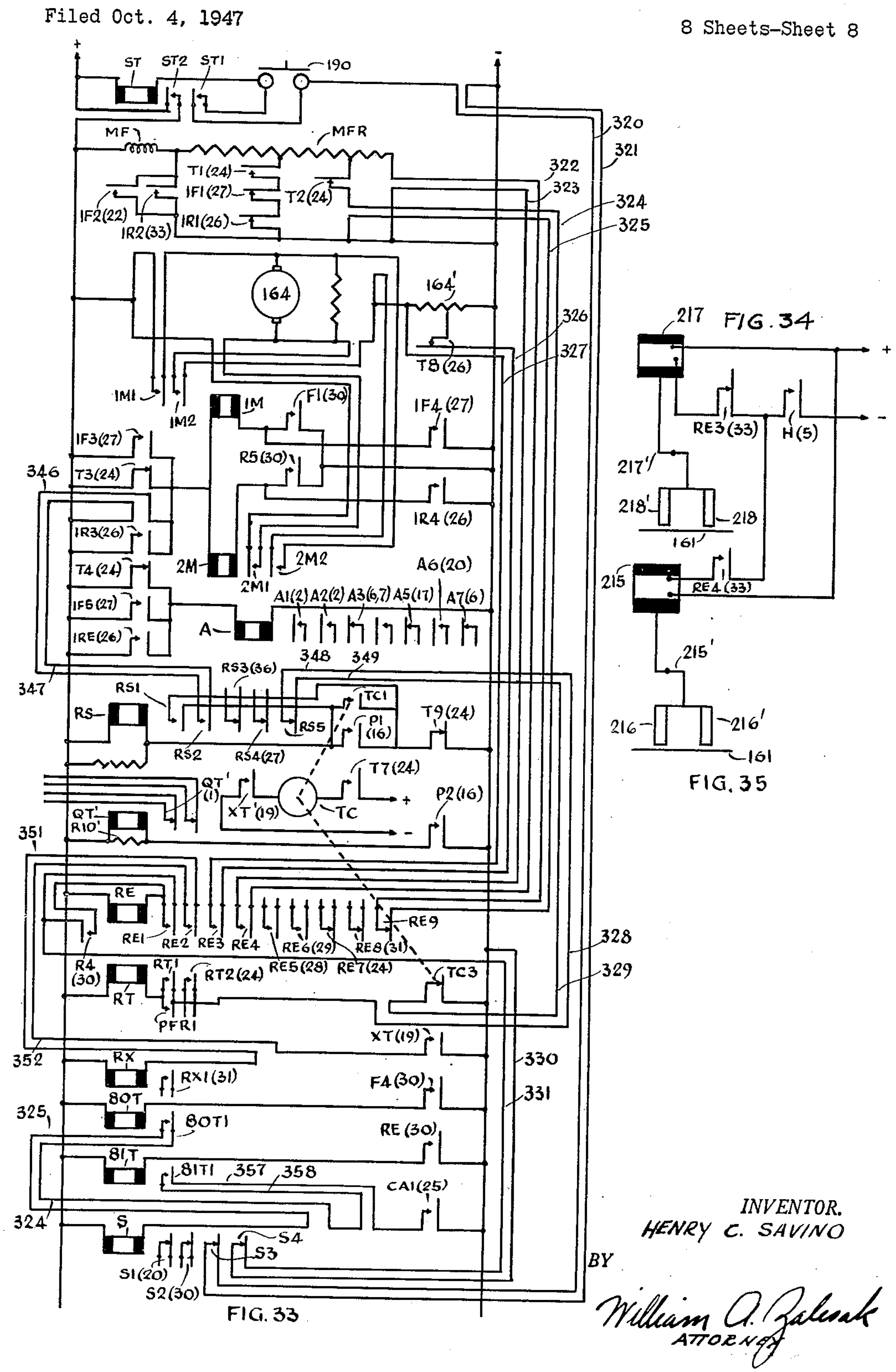

The novel features which I believe to be characteristic of my invention are set forth with particularity in the appended claims, but the invention itself will best be understood by reference to the following description taken in connection with the accompanying drawing in which Figure 1 is a schematic and diagrammatic representation of an automatic telemetering system with parts in perspective showing the apparatus and circuits employing my invention; Figure 2 is a circuit diagram of a starting circuit for the device shown in Figure 1; Figures 3 and 4 are circuit diagrams of photoelectric control circuits employed in an automatic dialer made according to my invention; Figure 5 is a circuit diagram of the motor control circuit for the automatic dialer made according to my invention; Figure 6 is a stepper system utilized in connection with the circuits shown in Figures 3, 4 and 5; Figure 7 is a diagram of the circuit employed with the stepper of Figure 6; Figure 8 is an enlarged view in perspective of the automatic dialing and recording system utilized with my invention and shown in Figure 1; Figure 9 is a section taken along the line 9—9 of Figure 8 showing a cross section of the light housing and photocell housing; Figure 10 is a plan view of a card prepared for utilization with a system made according to my invention; Figure 11 is a transverse section taken along line 11—11 of Figure 12 of the photocell housing of the automatic dialer showing the arrangement of photocells in the various compartments; Figure 12 is a section taken along the line 12—12 of Figure 11; Figure 13 is a diagrammatic representation of the pulser system for operating the recording mechanism of Figure 1 and made according to my invention; Figure 14 is a detail of one of the dials utilized in the pulser shown in Figure 13; Figure 15 is a section taken along the line 15—15 of Figure 14; Figure 16 is a diagrammatic representation of the recording mechanism associated with the automatic dialer; Figure 17 is a diagrammatic representation of the operating mechanism of each of the recording wheels of the recorder shown in Figure 16; Figure 18 is a simplified circuit diagram utilized in connection with the apparatus shown in Figure 17; Figure 19 is a circuit diagram of the recorder control circuit and Figure 20 is a circuit diagram controlling the forward and reverse rollers for moving or rejecting the recording card and for resetting the apparatus shown in Figure 1; Figure 21 is a perspective of a modified form of my invention utilizing continuous strips or tapes with the customers' cards printed thereon; Figure 22 is a plan view of the printed strip showing the position of the various photocells with respect to the strips; Figure 23 is a plan view of a prepared strip showing the various apertures and slits utilized with the device shown in Figure 21; Figures 24 and 25 are circuit diagrams of photocell amplifier circuits utilized with the modified form of my invention; Figures 26 and 27 are photocell amplifier circuits utilized for centering a customer's printed information on the recording device shown in Figure 21 prior to dialing and recording the received information on the customer's card; Figures 28 and 29 are phototube amplifier circuits used in connection with returning a customer's card to recording position if a busy signal is received; Figure 30 is a circuit diagram of the starting and reversing photocell circuits controlling the motor for winding and unwinding the continuous strip cards; Figure 31 is a side elevation of the strip for recording unrecorded cards and controlling the motor for reeling and unreeling the strip; Figure 32 is a plan view of the control strip shown in Figure 31; Figure 33 is a motor control circuit for controlling and stopping the driving motor for driving the strips shown in the apparatus shown in Figure 21; Figures 34 and 35 are diagrammatic representations of the punching arrangement for punching apertures on one of the strips in connection with the operations taking place when a busy signal is received.

Referring to Figure 1, the apparatus made according to my invention comprises three main groups separated by the vertical dotted lines shown in Figure 1. Group 1 includes the automatic dialing and recording system made according to my invention; Group 2 includes the central telephone office through which connections are made to the subscriber's meter and through which recording is done and which connects the dialer and recording equipment with the subscriber's telephone line and meter equipment; and Group 3 includes the meter equipment and its associated mechanism for returning observed intelligence back through the central office to the automatic dialer and recorder for recording purposes.

*General description*

The automatic dialer and recorder includes several main elements including a card support and lamp housing 20 having a transparent supporting top which supports a customer's prepared card for controlling the automatic dialing and for recording the received intelligence from the meter system. Associated with this lamp housing and card support is a movable housing 21, containing a plurality of photocells, which moves across the card and is actuated in a manner to be described for causing automatic dialing. It is provided with cable 21' for the photocell circuits and rests against switch 24'' to keep it closed when housing 21 is in initial position. This movable photocell housing is associated with a rack 22 and pinion 23 operated by means of a driving and pulser motor 24 which causes automatic dialing as the photocell housing moves back and forth across the card in response to predetermined perforated information on the card. A recorder 25 which automatically prints the received intelligence on a customer's card is supported on a shelf adjacent the lamp housing by means of the pivoted arm 26 operated in a manner to be described. This recorder includes a plurality of recording elements associated with and operated electrically by a frequency generating device having a plurality of conventional electrical pulse generating units 27, 28, 29, 30, 31 and 32, all of which operate continuously and simultaneously and, each of which operates at a different frequency F1, F2, F3, F4, F5 and F6. It is understood that more or fewer could be used as desired. To insure that only the desired frequency passes to and from the generator device, filters 33, 34, 35, 36, 37 and 38, each passing only its own frequency, is associated with the recording equipment and pulser and connected thereto by conductors 33', 34', 35', 36', 40', 38', 38'', 41' and 41'', the conventional pulser driven by pulser motor 24 operating in the usual manner to automatically dial and connect the recording or main office through the telephone lines 41', 41'' to the central telephone office with the subscriber's meter equipment.

It will be noted that one pair of conductors 39 and 40 is connected directly to the frequency generating sources 31 and 32 without passing through the recording device for purposes to be described. To prevent undesirable feedback from the frequency generating sources to the pulser, filter 41 connected across conductors 41' and 41'' may be used, which will pass only the pulsed current from the pulser 24 through the central office 42 for controlling the automatic connecting equipment within the central office.

A pair of contacts QT' connect the subscriber's line to the central office and are opened under certain conditions by means of circuit arrangements to be described.

The lines 43' and 43'' are connected in the usual way through the central office to a subscriber's station 43. Connected across the subscriber's line by conductors 44' and 44'' is a relay O to which the current is fed through filter 44 to control contacts O' for automatically connecting the meter system to the recording office if the line is not busy.

A meter box 45 shown in perspective schematic may be provided with a plurality of meter dials such as 46, 47, 48 and 49, for recording the consumption of water, gas, electricity or the like. These dials are provided with operating elements to be described, which automatically control pulsing equipment for sending observed intelligence at the meters by means of the electromagnetically operated solenoid motors 55, 56, 57 and 58 and their associated pulsers connected to the subscriber's line as indicated, the automatic pulsing device associated with the meters and said solenoid motors being connected to the subscriber's line by conductors 50', 51', 52', 53', 54', and 54'' through filters 50, 51, 52, 53, and 54 which respond only to predetermined frequencies as sent out from the recording office, each filter passing only one frequency. For example, filter 50 passes frequency F1 from pulse generator unit 27, filter 51 frequency F2 and so on, filter 44 passing frequency F6 for operating relay O when a connection is made and frequency F5 being passed only through filter 54 to operate the solenoid motors simultaneously to energized position.

Describing the above system generally, when it is desired to make a recording, a customer's card is inserted beneath the photocell housing 21 to lie upon the transparent top of housing 20, the card being stopped against the stop member 60 between feed rollers 62 and 62' and 63 and 63' and under the recording housing 25. These rollers are driven by motor 140. In being so positioned the card passes through a light beam to the starting photocell in housing 61 controlling a photocell relay circuit to be described later. This automatically starts operation of the dialing equipment causing the photocell housing 21 to move over the card for causing the dialing operation and recording the received intelligence by movement of the recorder 25 against the card if no busy signal is received. After this the card is ejected from the front end of the lamp housing 20 by means of rollers 62, 63, the device being reset when the photocell 61 again is rendered operative. The stop 60 is automatically removed to permit movement of the card in a manner to be described. If the line is indicated as busy the rollers 62 and 62' and 63 and 63' return the card to the rear under the photocell housing 21 to be re-inserted at a later period, the equipment again being reset when the light beam to the photocell in housing 61 becomes uninterrupted when the card leaves the recording equipment.

Briefly, when the customer's card is in proper position against stop 60, the light beam to the starting photocell in housing 61 being interrupted, a chain of operations is caused to take place, moving the housing 21 back and forth across the top of the card on the lamp housing 20 in response to light beams shining through prepared perforations in the customer's card. This causes automatic operation of the pulser 24 in accordance with the prepared perforations to automatically dial the customer's number and connecting the subscriber's house telephone number which is punched on the card. This automatically connects the meter system at the customer's station across the line so that the different frequencies may pass from the recording station over the line to the various meter dials. The electromagnetically operated solenoids 55, 56, 57 and 58 pulse the various frequencies to operate recording wheels within the recorder 25 in a manner to be described. At the proper time when the recorded intelligence is received at the recorder and the recorder wheels are set, the recorder is pressed against the card to record the information received, after which the card is passed on as described above.

*Automatic dialer*

Before describing the detailed operation of the various control circuits associated with the automatic dialer, the control card and the lamp housing will next be described. The control card, that is the subscriber's card for controlling the automatic dialing and also for recording the received intelligence, is shown in Figure 10. This card 66' consists of two parts, the right-hand part upon which is printed the name and address of the subscriber and the various months of the year with spaces to record the received intelligence, and the left-hand side of the card which is divided into a plurality of squares as shown, the left-hand column being provided with designations B1' to B8' inclusive, the next column being blank, and the succeeding columns including letters and numerals as shown. This provides the control portion of the card and is perforated in accordance with a predetermined pattern corresponding to the subscriber's telephone number. The left-hand column marked B1' to B8' inclusive is punched with a plurality of holes depending upon the number of photocell circuits it is proposed to control and which photocell circuits correspond in number to the number of elements in the called number of the subscriber. As can be seen the first two top squares starting with the third column and moving horizontally across the card include letters A to Z inclusive.

The lamp housing for supporting the control card and light source for energizing the various controlling photocells comprises a housing 20 having in its base a lamp 65. The housing is covered by a transparent glass top supporting member 66, extending beyond the housing and providing a shelf 67 under the recorder 25.

Thus when a prepared card 66' is placed on top 66 of the lamp housing, light rays from the lamp 65 pass through the transparent glass top supporting the member 66 through the apertures in the card and energize any photocell mounted in the photocell housing 21 of the photocell relay registering with any aperture. The right-hand portion of the card extends beyond the light chamber or housing and is supported by shelf 67 against which the recorder 25 may be pressed to impress the received intelligence on the card in the recording and control position.

The photocell housing 21 which passes over the card to intercept the light beams passing through the apertures in the card is shown in greater detail in Figures 11 and 12. As is apparent from the transverse section in Figure 11, the housing is divided into compartments by means of a longitudinal partition or wall 68 and transverse partitions 69, 70 and 71 and so on. Mounted in the left-hand compartments are photocells which for explanation of the circuits to be described are designated B1, B2, B3 and B4, etc., and in the right-hand row of compartments C1, C2, C3 and C4, etc., each photocell being completely shielded from its neighbor by the partitions so that when a photocell is exposed to a light beam through an aperture only that photocell will be affected which registers with the aperture. Thus as the photocell housing passes back and forth over the top of the card the various photocells will intercept the light beams passing through the apertures in the card to control the automatic dialing mechanism in a manner to be described.

*Dialer circuits*

When a card has been placed on the top 66 of automatic dialer, the card passes under the starting photocell housing 61 and intercepts the light to the photocell mounted within this housing. This photocell and its associated control system is diagrammatically shown in Figure 2, the photocell being designated CA. This photocell is connected to a conventional amplifier circuit comprising a grid controlled vacuum tube 75 and resistor 76, the various voltage sources 77, 78 and 79 supplying current for operation of the phototube CA, tube 75 and the coil of relay A, the photocell having one side connected by conductor 75' to the grid of the tube 75.

With no light shining on photocell CA battery 78 applies a biasing voltage to the grid of tube 75 to cut off the current through the tube, thus keeping relay A deenergized. With light on photocell CA a current flows through resistor 76 causing a voltage drop thereacross. This voltage drop affects the biasing voltage of the grid of tube 75 so that it passes current to energize relay A. This relay is thus energized when no card is in the dialer and recorder mechanism.

The control circuits for the photocells mounted in the photocell housing 21 are shown in Figures 3 and 4. Figure 3 schematically showing the circuits for the B photocells and Figure 4 the circuits for the C photocells.

As shown in Figure 3, each of the photocells B1 to B8, inclusive, is connected in series with a plurality of contacts C1R'' to C8R''. These contacts are controlled by relays to be described. One side of the photocells is connected to the conductor 82' and one contact of each pair of contacts is connected to conductor 80'. The cells and contacts are connected in series with the resistor 81 and voltage source 82. A grid controlled amplifier tube 80 is connected across the resistor 81 and biasing voltage source 83. The output of the tube has connected thereacross the coil of the relay B in series with the voltage source 84.

The circuits for the C photocells are identical for those of the B photocells and function in a similar manner.

In Figure 5 there is shown a control circuit for the pulser motor and transfer control mechanism. The main conductors 24' and 24'' have a plurality of elements connected thereacross. Starting at the top of the circuit diagram there are shown a plurality of pairs of relay contacts A1, D1, B1'' and C' connected in series with the coil of the relay D. The next group of elements include the field winding 24' of the pulser motor 24 and the variable resistor R1 for controlling the field winding current. The pulser motor 24 is connected in series with the pair of contacts D2 and has connected thereacross the dynamic break resistor R2. The coil of relay H and the coil of relay C1R are connected through the contacts C1' and A2 as shown. A plurality of relay coils C2R to C8R, incusive, have one side connected to the conductor $24_1$ and the other side connected through the pairs of contacts C2 to C8' to conductor 24'.

*Operation of automatic dialer*

The various contacts of the various circuits are in the position shown at the start of operations, that is contacts A1 to A7, when photocell CA is exposed to light and coil A energized are in the position indicated in all the circuits where they are included; that is, contact A1 in Figure 5 which is the control circuit for the pulser motor 24 and transfer control circuit for the photocells in the photocell housing 21, is open as is contact A2. In the figures the various relay armatures and switches are shown diagramatically associated with their respective relay solenoids. Where the relay armatures or switches are shown in a circuit of a different figure, it will carry the same designation in the circuit figure followed by a numeral in parentheses indicating the figure in which the relay appears. If the switch or armature which is shown associated with the solenoid is not shown connected in the figure, the switch is identified and followed by a numeral in parentheses showing the figure in which the armature or switch is connected in the circuit. For example, if a switch is designated D1 and associated with the solenoid D1 of relay D1 and is not connected in the circuit in the same figure in which the switch appears, a numeral in parentheses following the switch designation indicates the figure in which the switch is shown connected in circuit. Likewise, if the switch appears in a circuit figure and is not associated in that figure with its own solenoid, the figure in which the solenoid appears is indicated in parentheses following the designation of the switch; that is, if switch D1 is not shown associated with its solenoid D1, it is followed by a numeral in parentheses indicating the location of the solenoid in some other figure. However when the light beam is intercepted by the customer's card coil A is de-energized whereby contacts A1 and A2 of the motor control circuit of pulser motor 24 are closed. As a result the coil of relay C1R is energized, causing contacts C1R' and C1R'' of Figures 3 and 4 to close. These control the circuits of the photocells of the C and B group. These circuits up to this time were open to prevent operation by exposure of the photocells to light through perforations in the customer's card. Closing of contact C1R' connects photocell C1 across its amplifier comprising tube 85, resistor 86 and voltage sources 87, 88 and 89 to energize the relay coil C when the photocell is exposed to light. Likewise, closing contact C1R'' places photocell B1 across the amplifier comprising the phototube 80 and resistor 81 provided with voltage sources 82, 83 and 84, thus energizing coil B of the relay B when the photocell B1 is exposed to light. Thus the circuits in Figures 3 and 4 in the photocell groups B and C are setup to energize the relay coils when the photocells are exposed to light.

As has been previously pointed out the photocell housing is in such position that the photocells B1 to B8 register with the first left-hand column having squares B1' to B8' inclusive. However inasmuch as spaces B1 to B7 inclusive on the customer's card have been apertured light falls upon photocells B1 to B7, inclusive. The circuit of photocell B1 is energized since C1R is now closed, causing energization of coil B of the relay B of Figure 3. Photocell B8 and square B8' are used only when the customer's phone number has eight digits. This causes closing of the contact B1'', Figure 5, in the motor circuit. Thus inasmuch as A1 has previously been closed when light to photocell CA was interrupted by insertion of a customer's card, and since C' is in closed position a circuit is completed through coil D of relay D. When the coil D is energized contacts D1, D2 and D3 are closed placing motor 24 across the line and providing a holding circuit across B1'' so that when the photocell B1 is de-energized upon movement of the photocell housing 21 away from the first column of the card, coil D will remain energized. Closing of D2 closes the motor control circuit causing pulser motor 24 to operate to move the photocell housing 21 across the card from left to right. Contact D3 is closed to maintain the circuit closed through other relay coils for purposes to be described below since the contact E of the switch 24'' is closed only when the photocell housing is in its initial position as shown in Figure 1.

When the motor 24 is energized it moves the housing 21 from left to right across the card. As it moves away from its initial position photocell B1 no longer is above the light beam, thus de-energizing photocell B1 and coil B of the relay and dropping out contact B1'' of Figure 5. However, inasmuch as holding contact D1 is closed across B1'', the coil D will remain energized keeping the circuit of the pulser motor 24 closed, causing continued movement of the photocell housing 21.

Assuming that the card described in Figure 10 is in position on the light housing and card support 66, the photocell housing 21 will move so that photocell C1 in the first compartment registers with the aperture in the third column, top line. This would correspond to the letter B of the number Bergen 2–8966, which is selected for purposes of illustration. Inasmuch as photocell C1 has been placed in circuit as described above, coil C of relay C becomes energized. As the result contact C' in series with the coil D of Figure 5 opens de-energizing coil D and opening contacts D1, D2 and D3, thus opening the circuit to the pulser motor 24. As a result further movement of the photocell housing 21 ceases and the pulser motor in the conventional well-known manner is returned to its initial position, causing operation of the rack and pinion 22 and 23 to return the photocell housing 21 to its initial position, the pulsating motor sending a single pulse over the line in a well-known manner by opening the circuit once.

When the housing returns to its initial position contact E is again closed, thus providing means for completing a circuit between coils of the various relays C2R to C8R inclusive in Figure 5, contacts D1, D2 and D3 having been opened when coil D became energized.

In a manner to be described the control is then shifted to relay C2R by closing contact C2' of Figure 5. This causes energization of the relay C2R closing contact C2R' of the circuit shown in Figure 4 to place photocell C2 in operating condition and photocell B2 in operating condition by closing contact C2R'' of Figure 3. Thus the equipment is again set up to repeat the operation described above.

Inasmuch as the housing 21 is now again in its initial position with contact C' again closed, the group of photocells B1 to B7 inclusive are now again in position over the apertures in the card and are exposed to light. B1'' is again closed because relay B is again energized inasmuch as photocell B2 is exposed to the light passing through the aperture B2' in the first column of the card. This again causes energization of the coil D which closes holding contact D1, motor control circuit contacts D2 and contacts D3 causing pulser motor 24 to again move the photocell housing 21. The housing is again moved from left to right until photocell C2 registers with the light beam passing through the E square in the second horizontal line. When this takes place photocell C2 is energized causing energization of the coil C opening up contacts C', de-energizing coil D which drops out contacts D1, D2 and D3, thus stopping the motor and disconnecting the photocell circuits. The pulser motor is again returned to its initial position and as it does so it sends out two pulses which are passed to the central office to continue the automatic dialing. The above operations are repeated until all of the apertures have been passed over in succession by the various photocells which are successively put into operating condition in the manner described above, the housing remaining in its initial position after the last photocell circuit has been opened.

*Transfer mechanism for dialer*

As described above it is necessary to provide some means for successively transferring the control from the various relays C1R to C8R in succession so as to close the photocell circuits in the same order.

The device for accomplishing this operation is shown in Figure 6 and is referred to as a stepper or stepper switch. It is shown diagrammatically in Figure 6 with its associated operating mechanism and the schematic circuit diagram is illustrated in Figure 7.

This device includes a rotatable stepper gear wheel 91 and contact wheel 93. In its initial position it is in the position indicated in Figure 6 with the contact C1' closed (see also Figure 5), the fixed contact being connected by a conductor 95 to one side of the contact assembly and one side of the pulser motor 24, the other conductors from the various contacts C2' to C8' being connected to one side of the relay coils C2R to C8R. The contacts C1' to C8' are mounted on a contact wheel 93 associated with a stepper gear wheel 91 which is retained in each position by the pawl 92. Contact C1' to C8' are connected to the relays in any desired fashion, one such way being a ring and brush connection.

To operate this switching arrangement an electromagnetically operated arm is provided cooperating with the stepper gear wheel 91. It consists of a coil G1 provided with contacts 87' and 88' to be connected across the coil G1 under certain operating conditions, and a pivoted arm 89' pivoted at 90, the arm being provided with shorting bars 89'''' and 89'' for purposes to be described. The contacts 85', 86', are connected by conductors 96 and 97 through contact A3 across contact C'', the contact C'' being operated by relay C of Figure 4 and contact A3 by relay A of Figure 2. A delay resistor R3 is connected across coil G1 and a line short circuiting resistor R4 is connected in series with the coil. When the coil of relay A in Figure 2 is energized contact A3 opens so that the coil G1 can not become energized.

To prevent energization of G1 until desired, relay H of Figure 5 is energized whenever contact C1' of Figures 5 and 6 is closed. This causes the contact H of Figures 6 and 7 to close so that coil G1 is shorted out whenever A7 is closed. R4 then limits the current. However when coil C of photorelay circuit C1R' Figure 4 is energized to stop operation of the pulsator motor 24, contact A7 then being open contact C'' closes energizing electromagnet G1, causing the pivoted arm 89' to move down and rotate wheel 91 so that contact C2' closes and opens C1' thus de-energizing relay C1R of Figure 5 and taking photocell C1 and B1 out of an operating circuit and energizing coil C2R and closing contacts C2R' and C2R'' putting photocell C2 and B2 in operating condition when contact E of Figure 5 closes on return of the housing 21. A7 is open during this operation so that G1 is no longer shorted by H contact. Thus each time the coil of relay C is energized the stepper is moved one position, placing the next relay coil in an operating condition.

R3 is only used during resetting. Referring to Fig. 7 it can be seen that R3 is not connected during operation since A7 is open. Only during resetting with no card in the apparatus and A7 closed is R3 used to insure that arm 89' makes its full stroke. Since when it leaves the original position, where contacts 85' and 86' are made, the circuit is broken and there may be a possibility that the magnetic flux in G1 will decay too rapidly and permit arm 89'' to return before it has completed its stepping operation. To insure that the flux does not decay immediately, enough discharge resistance is inserted in parallel to delay the decay of the magnetic flux. When arm 89' has completed its stepping operation it closes contacts 87' and 88', which shorts out the discharge resistance R3, and causes the flux in G1 to decay immediately, so that the arm 89' immediately returns to the original position, by action of spring 89''', for another operation. This continues until it reaches the original position where contact H closes and shorts out G1.

*Automatic pulsers*

When the automatic dialer has dialed all the numbers the recording equipment and the metering equipment are connected in circuit through the central office. The filter 44 permits operation of the relay coil O inasmuch as this circuit is open to the electrical impulses from the generating device 32, which causes an alternating current of frequency F6 to flow over the lines through the central office. Upon energization of the relay coil O contacts O' close, thus placing the metering equipment across the line. At the same time all of the frequencies generated by the frequency generating units 27 to 31 send current pulses having frequencies F1 to F5 inclusive over the lines, frequency F5 flowing through the filter 54 designed to pass currents of frequency F5 to energize the pulsator electromagnet driving motors 55, 56, 57 and 58 which respond to currents of these frequencies to cause the pulsing apparatus of each of the dials to function in a manner to be described.

To obtain a better understanding of the operation of the automatic pulsers associated with the meter dials 46 to 49 inclusive, reference may be had to Figure 13 showing in detail the pulsing telemeter arrangement associated with each dial for sending pulses back in accordance with the position of the meter dial with which it is associated. This arrangement is shown in diagrammatic perspective. Only one unit of the associated elements will be described, it being understood that all of the dial meters are provided with the same elements. The equipment associated with dial 46 will be described. As indicated the solenoid driving motor 55 is provided with a rack 100 associated with the driving gear 101 mounted for rotation on stationary shaft 102 so that when moved up into the coil of the solenoid 55 gear 101 rotates. A cam 103 having pips 103' is also mounted on shaft 102 and fixed to gear 101 to rotate therewith. The pip-like cam surfaces 103' operate the normally open switch 104 to closed position each time a pip contacts a switch to complete the circuit from pulse generator 27 through filter 33, line 40', line $41_2$ through the central office, line 53', switch 104, line 54'', filter 53, switch O, central office 42, line $41_1$, stepper solenoid G–2, line 33', filter 33, pulser 27. Thus current can flow from pulser 27 only when switch 104 is closed. Each time switch 104 closes a pulse of frequency F1 flows through circuit operating G–2 once to advance the disc 120 one step. Mounted for rotation on the same shaft below the cam 103 is a disc-like member 105 having a struck-up finger 106 and a spring 107 connected between the disc and the shaft so as to permit relative rotation of the shaft and the disc. When the cam 103 rotates to the right or clockwise as viewed a depending finger 108 mounted thereon contacts the spring catch 109 forcing the pin 110 downwardly and engaging stop 109' of spring 109. This pin permits rotation of the cam 103 and until the pin 110 engages the projection 111 on the disc 112 directly associated with the meter dial 46, a pawl 114 being associated therewith to prevent rotation of the disc 112 and meter dial 46 when the pin 110 engages the projection 111. The cam 103 and disc 105 rotate through an arc depending upon the position of projection 111, which in turn depends upon the reading of the dial. If the projection is in position corresponding to the reading 3 on the meter dial 46 the cam is rotated through an arc sufficient to cause switch 104 to be contacted by three of the extensions 103' on the cam to cause three pulses to be sent out over the line. As will be described below, pulsing will not take place when the metering arrangement is returned to initial position, since the circuits from the meter to the recording equipment are no longer connected.

As will be described below even before the disc 105 is moved, coil G2 of the recording mechanism to be described will have operated once when the circuit is established to the customer's premises. This will indicate zero.

When spring 55' returns the rack 100 to initial position, it rotates cam 103 counterclockwise, moving pin 108 away from stop 109'. Spring 107 then rotates disc 105 counterclockwise until arm 106' contacts finger 106. If the disc 112 is in such position that no pulsing is desired due to the fact there is a zero reading, the projection 111 is formed as shown in Figures 14 and 15, ridges being provided along the top of this projection 111 to receive the end of the pin, which is pointed, to be received within the depressions between ridges. This locks disk 105 and cam 103 against rotation.

As the pulsating switch 104 is opened and closed, the current pulses are sent through the operating magnetic coil G2 of the recorder 25 in a manner to be described to cause a stepper recorder to function to rotate the recording wheel to the proper position to cause imprinting of a number indicated on the dial. Thus, if the dial reads 3, three pulses will be sent back through the line through the coil G2 to step the recorder wheel blank three steps so that the numeral three will be in position to print numeral three on the customer's card.

*Recorder*

To better understand the operation of the setting of the recording wheels in the recorder 25, reference is had to Figures 16 and 17 schematically showing the recorder and the arrangement of a single recorder wheel and associated elements and Figure 18 showing the schematic diagram of the circuit. In Figure 16 is diagrammatically illustrated the recorder 25. Within the housing there is supported a plurality of rotatable recording wheels, including wheels 120, 135, 136 and 137. Each of these wheels is of the form shown in greater detail in Figure 17. They are all mounted within the housing 25 of the recorder, which in turn is mounted on the pivoted arm 26, as described in Figure 1. This arm is operated to move the recorder to recording position when the operating coil 138 is energized. The circuit to the coil 138 is controlled by two pairs of relay contacts XT2 and ZT1, XT2 being closed and ZT2 being open. Referring to Figures 17 and 18, when pulses are sent out over the line in response to the opening and closing of the pulser switch at the meter dial, coil G2 is energized a number of times corresponding to the pulses sent. The contact A5 is open at this time. As a result the actuating arm 126 pivoted at 127 moves down to coil G2 as the pulses come over lines 33′, 25′. At the same time the recording wheel 120 which has fixed thereon type, such as 121, 122, 123 and so forth with the numerals zero through 9 thereon, is caused to rotate a number of stops corresponding to the number of pulses, the inking brush 124 applying the ink to the surface of the type.

A pawl 120′ may be utilized to insure that the recording wheel remain in the position desired. As the wheel rotates the contact M, connected to contacts 128 and 129 as shown, is opened as is also contact 1M for purposes to be described below.

Referring to Figure 17, resistors R5, R6, contacts 130, 131, 128, 129, M are only used during the resetting operation when A5 is closed. During recording A5 is open, therefore all the contacts mentioned above are in open circuits.

As explained above in connection with Figure 6, this circuit (Fig. 18, 17) R6 delays the decay of the magnetic flux and R5 limits the current when G2 is short-circuited by contact M.

In order to control the recorder so that it will move to recording position only after all of the recording dial wheels are in the proper position for making the impression, I provide a circuit for this purpose shown diagrammatically in Figure 19.

Figure 19 illustrates the circuit controlling the recorder 25. The relay coil XT is connected in series with contacts 1M, 2M, 3M and 4M of each recorder wheel across the lines and is shunted by means of the resistor R8. R8 is inserted in the circuit to delay the dropping out of XT so as to give the stepper time to receive all the pulses before recording. Thus when XT is initially energized it closes XT1 energizing relay ZT of Figure 19 and opens XT2 of Figure 16 preventing energization of magnet 138 and moving of recorder to recording position. In the initial position of each of the recorder wheels as shown in Figure 17 the contacts 1M on the wheel 125 are closed and the other contacts 2M, 3M and 4M on each of the other wheels are also closed. However, when all of the wheels are moved to recording position, one pulse being required to move the wheel to record zero, the contacts 1M, 2M, 3M and 4M are opened, thus de-energizing coil XT. When this occurs contact XT2 closes and contact XT1 opens. However the relay ZT is still energized because of the lag caused by resistor R9 so that ZT1 in Figure 16 is momentarily held closed, thus momentarily a circuit is completed through coil 138, Figure 16, moving the recorder down against customer's card to record the readings of the dials at the customer's station. When coil ZT times out, contact ZT1 opens and the recorder returns to its initial position.

When the recorder moves to recording position it closes contacts P1 and P2 Figures 16 and 20 which control relays K and QT shown in the roller circuit of Figure 20. Relay K controls the card roller motor circuit and relay QT controls switch QT′ connecting the recorder to the central office as shown in Figure 1.

*Card roller circuit*

As shown in Figure 20 the roller motor 140 for rollers 62 and 62′ and 63 and 63′ of Figure 1 and which are belt connected is connected through two sets of contacts K1, K2 and L1 and L2 across the line, these contacts being operated by means of the relays K and L energized in a manner to be described. When the recorder housing 25 moves to recording position contacts P1 and P2 are both closed. Inasmuch as contact A6 is closed inasmuch as relay A of Figure 2 is energized, coil K is energized closing the contacts K3, K1 and K2, K3 providing a holding circuit and K1 and K2 putting roller motor 140 across the line to move the card out of the recording machine. Coil K of Figure 20 being energized, contact K4 of Figure 16 closes energizing solenoid 138′, pivoting arm 63″ about pivot 63‴, pressing wheels 63 and 63′ and 62 and 62′ together so that the card can be moved out by the rollers. Stop 60 is lifted.

As the card passes out of the machine the circuit to photocell CA of Figure 2 is again energized energizing relay A, Figure 2, opening contact A6 and thus de-energizing relay coil K opening contacts K1 and K2 to the roller motor and stopping the roller motor. When P2 was closed, coil QT was energized and as a result contacts QT shown in Figure 1 were opened and the lines connecting the automatic dialing recorder to the central office, thus disconnecting relay 0 and contacts 0′ and thus disconnecting the metering system from the telephone line. QT is a lag coil relay and doesn't drop out immediately due to resistor R10. This is important since if QT were to operate for a very short time there would be a possibility that the line would not be disconnected. This happens in every day use of the telephone. However, all of the above operations occur so rapidly that no or little ringing current is sent over the line to call the subscriber.

If, however, a busy signal is received, then it is desired to reject the card so that it may be re-inserted at a later period and a recording made. If a busy signal is received XT3, Fig. 20 remains closed inasmuch as XT, Fig. 19, continues to be energized since no pulses are sent back to the recording mechanism and switch 1M remains closed. This energizes coil 7T which closes the timer motor contact 7T2 of control timer motor 141, which continues to operate for a predetermined period of time, for example, ten seconds, and then picks up the timer contact 142 to energize the relay coil L, closing contacts L1 and L2 and reversing roller motor 140. This pulls the card out, permitting the photocell CA to again be energized by the light beam. However to prevent the roller motor from being immediately de-energized a time delay resistor R11 is provided for the relay 7T so that the timer contact 7T1 remains closed and the card is fully ejected from the system.

The purpose of the closed contacts A3 in Figure 6 and A5 in Figure 17 is to cause the apparatus to reset itself after recording when the photocell A is energized to close these contacts after the card is passed through or rejected by the system, the wheels 91 of Figure 6 and 120 of Figure 17 being returned to initial setting by a recycling process by causing G1 and G2 to keep stopping until initial position is reached.

When wheel 91 reaches the position where C1′ is again closed coil H of Figure 5 is energized, closing contacts H of Figures 6 and 7 shorting G1 so that it stops cycling.

When wheel 120 of Figure 17 reaches initial position contact M closes, Figure 18, shorting G2 to stop cycling.

*Continuous strip card modification*

As described above, one modification of my invention utilizes a continuous strip with the customer's card information printed thereon instead of individual cards. Here the cards are printed in succession on a strip fed through the machine, the cards being automatically fed through the apparatus and halted in position to permit the dialing and recording operations.

The cards which are printed in the form of a strip are mounted on positively driven drums to be reeled on and unreeled in the proper sequence. The necessary perforations are provided in each card to porform functions described above of bringing each card into the machine, positioning it properly, dialing curtomer's number, sending the necessary frequency currents to read customer's meter, receiving the impulses sent back by the meter, translating the impulses to numbers which indicate the reading on the customer's meter, stamping these numbers on the customer's card, moving the card from the machine and then bringing the next customer's card into position.

In addition to the above, means are provided utilizing photocells for redialing in case a busy signal is received.

The automatic dialing and recording system utilized in the first-mentioned arrangement above is substantially identical to that utilized with the present modification.

In addition to the strip bearing the customer's card, a second ribbon or strip also moves synchronously and simultaneously with the card strip or ribbon and its function is to record uncompleted calls and complete uncompleted calls.

A similar light chamber is utilized as in the first case with the exception that it is extended to provide the necessary light beam with the additional photocells utilized.

*Dialer*

Referring now specifically to Figure 21, a light chamber 20′ similar to that shown in Figure 1 is utilized. Pulser motor 24, rack and pinion 22 and 23 and movable photocell housing 21 as well as the recorder 25 and its pivoted arm 26 are identical with the arrangement shown in Figure 21. However customers' cards are printed on a continuous paper ribbon 160 and pass from one roll 162 to the other roll 163 when driven by means of driving motor 164 and driving belt 165. A second auxiliary strip 161 is utilized for purposes to be described in controlling the operation when a busy signal is received. Mounted above the card are a plurality of photocells, R, IF, IR, F, PR, PF, LR, LF and T the positions of which are more clearly shown in Figure 22.

In operation when the equipment is started each customer's card is brought into position over the light chamber and under the photocells and automatically centered. When in position the automatic dialing equipment functions in exactly the same way as in the first modification. When the received intelligence has been printed on the strip 160 in the proper position the ribbon is automatically rolled onto roller 163 and the next card brought into position for recording purposes.

If a busy signal should be received when the card is in position, means are provided for automatically punching holes or apertures in the auxiliary ribbon 161. The light passing through these apertures causes various photocell circuits to function at a later period to cause the ribbon having the customer's card printed thereon to be returned to recording position on completion of the entire roll until all cards are recorded.

*Dialer customer strip*

Before describing the operation of the modified device, reference should be had to Figure 22 which shows the plan view of one customer's card in position with the auxiliary strip. It will be noted that there are a plurality of photocells positioned above the lamp housing, and above the strips, these photocells being designated by the letters R, F, IF, IR, T, PF, PR, LR and LF. These photocells are positioned above the card so as to cooperate with light beams which shine through various slits and apertures such as shown in Figure 23. Slit 170 cooperates with photocell F, which is the starting photocell; slit 171 cooperates with photocell R which is at the end of the strip; slit 172 cooperates with photocells IF and IR for properly centering the card; slit 173 cooperates with photocell T for purposes to be described; and slits 174, 175, 176 and 177 cooperate with photocells PF, LF, PR and LR respectively when it is necessary to return unrecorded cards which result from busy signals.

Thus whenever the ribbon having the customers' cards is moved so that any of the apertures above-mentioned register with the photocells cooperating therewith, light falls on the photocell for bringing about various control operations which will be described below. It is understood, of course, that the customer's card is punched out for automatic dialing in exactly the same way as described in connection with the individual cards; the photocell housing 21 having therein the various B and C photocells cooperating with the apertures in the customer's card.

*Photo cell circuits*

The starting photocell circuit is shown in Figure 30 and includes the latch relay 180 provided with latch 181, the relay coils F′, R′ contact S1 and S2 controlled by relay coil S, Figure 33. The latch relay is connected to the photocell F by means of an amplifier comprising the vacuum tube 183, resistor 184 and the voltage sources 185, 186 and 187. It is, of course, understood that all of the contacts initially are in the position indicated. When it is desired to start operations the first customer's card is brought into position such that the slit 170 shown in Figure 23 registers with the photocell F of Figure 22. With the apparatus so arranged the motor control circuit of the motor 164 and shown in Figure 33 is set into operation by closing the starting button 190. This immediately places the coil of relay ST across the power lines, energizing the relay coil ST, closing its contacts ST1 and ST2, providing a holding circuit across button 190 and putting the driving motor field MF across the line through the contacts T2 and RE9. At the same time the relay coil A becomes energized through closed contact T4. This coil A corresponds in function to the coil of photocell circuit A of Figure 2, the amplifier circuit, however, including the photocell CA and the tube 75 of Figure 2 no longer being necessary since the energization of the coil A is controlled entirely by the contacts T4, IF5 and IR5. However the motor 164 is not as yet energized.

The driving motor 164 of Figure 21 is now energized as follows: Inasmuch as photocell F of Figure 30 is exposed to a light beam through aperture 170 of ribbon 160, Figure 23, it becomes energized energizing coil of relay F′ of Figure 3, causing the latch 181 to move to the right hand position to maintain the relay contacts which have been closed in the closed position until coil R′ is energized. The energization of coil F′ causes contact F1 of Figure 33 to close. This completes a circuit through the coil of relay 1M and causes it to become energized since the contact T3 is closed and the relay coil 1M is thus placed across the lines. As a result of the energization of coil 1M contacts 1M1 and 1M2 are closed placing the driving motor 164 across the lines. This starts the rolls 162 and 163, Figure 21, to roll the ribbon upon 163 and unroll it from 162, causing the ribbon to move from left to right over the lamp housing 20′.

When the coil F′ is energized the following action also takes place: Contact F2, Figure 28, closes, contact F3 of Figure 29 closes, contact F4 of Figure 33 closes, contact F1 has previously been referred to. Contacts F2 and F3 assist in later completing a circuit for the photocells PF and LF for functions which will be described below, also closing of contact F4 causes relay 80 of Figure 33 to be energized for purposes to be described.

As the ribbon 160 moves over the top of the lamp housing the slit 173 registers with the photocell T, thus causing the photocell amplifier circuit shown in Figure 24 to function, energizing the coil T′.

When the coil T′ is energized all of the open T contacts close and all of the closed T contacts open, thus contact T1 of Figure 33 closes, contact T2 of Figure 33 opens, contact T3 of Figure 33 opens, contact T4 of Figure 33 opens, contact T5 of Figure 26 closes, contact T6 of Figure 27 closes, contact T7 of Figure 33 closes, contact T8 of Figure 33 opens and contact T9 of Figure 33 closes.

When the contacts are in this position the photocells IF and IR of Figures 26 and 27 are placed in operative condition for controlling the circuit of motor 164. Opening of contact T2 and closing of contact T1 takes some of the resistance MFR out of the circuit to the field MF of the driving motor 164, slowing the motor down. This is desirable since the current is approaching its recording position.

As the slit 172, Figure 23, passes under the photocell IF, Figures 22 and 27, the photocell IF is excited, causing energization of the relay coil IF′ as shown in Figure 27. When the coil IF′ is energized, contact IF1, Figure 33, opens to the motor field MF, contact IF2 closes, reducing the resistance MFR to the motor field. IF3 closes to keep relay 1M energized so that contact 1M1 and 1M2 stay closed, keeping the motor 164 running, the contact IF5 also being closed to keep the relay coil A energized for retaining the photocell control circuits in the photocell housing 21 in condition for operation for dialing at the proper time. Thus the motor 164 is slowed down and when the slit 172 passes from beneath photocell IF, the IF photocell circuit is de-energized to cause the motor to stop, that is, IF1 closes, IF2 opens, IF3 and IF4 open, causing the relay coil IM to be de-energized to open contacts 1M1 and 1M2, relay T3 being open, thus stopping the motor. IF5 also opens de-energizing the relay coil A so that the dialing operations described in connection with the first embodiment, see Figures 2 and 5, are initiated.

If however, the motor 164 coasts too far so that the card is not properly centered, the slit 172 in the card passes underneath photocell IR. This causes energization of the photocell IR, and its associated relay coil IR′ of Figure 26. As a result of the energization of this coil, contact IR1, Figure 33, opens and IR2 closes, cutting out resistance in the motor field MFR to the same point as when IF2 was closed. IR3 and IR4 are closed to energize the reverse relay coil 2M, closing the contacts 2M1 and 2M2. This reverses the motor, causing it to slowly return the card to center position, the various circuits being de-energized when the slit 172 is positioned between photocells IR and IF to stop the motor 164.

Due to the time delay actions of the various relays, although T4 has been opened, IF5 or IR5 remain closed until the customer's card is centered, keeping coil A energized, coil A being a time delay relay to prevent dialing until the customer's card is centered. After proper centering coil A is de-energized and dialing begins as in the first system described above.

*Strip winding control circuit*

After recording, means must be provided for causing the recorded card to move on and to position the next card. The circuit is shown in Figure 33. When the recorder 25 of Figure 21 moves down to record as in the first figure, it again closes the two contacts P1 and P2 carried by recorder 25 (see Figure 16). Closing of contact PT energizes relay QT′. QT′ functions to open the customer's line in the same manner as QT of Figure 20, for which it is substituted in my modification. When contact P1 is closed, coil RS of Figure 33 is energized, T9 being closed at this point causing contacts RS1 and RS2 to close. RS1 provides a holding circuit around contact P1 so that when it opens the circuit through RS will not be opened. Contact RS2 causes energization of the forward motor relay 1M, the F1 contact still being closed, causing contacts 1M1 and 1M2 to close circuits through motor 164 to cause forward movement of the strips and tapes 160 and 161. Contacts RS3 of Figure 26 and RS4 of Figure 27 open, thus taking photocells IR and IF out of operation so that they will not function when the slit 172 passes underneath either of these photocells. Otherwise it would interfere with the operation of the motor control circuit, Figure 33.

The contact RS5 in the circuit of coil RT, Figure 33, also opens for the purposes to be described later.

When the slit 173 passes from beneath photocell T, Figures 23 and 22, relay T′ of Figure 24 is de-energized, de-energizing relay coil T′. This causes contact T3 of Figure 33 to again close, closing the circuits through the forward relay coil 1M, through contact F1, which is still closed because of the latch action of the relay shown in Figure 30. T9, Figure 33 opens when relay T' of Figure 24 is de-energized. This drops out relay RS, thus opening RS2 after a short time delay caused by discharge resistance R10. Since T3 is now closed (Figure 33) the motor circuit is completed. The time delay of relay RS is to insure that enough time is allowed during the transition from RS2 to T3. This causes the strip to go forward to bring the next customer's card into position, centering being accomplished as before and the various other circuits being controlled as before.

*Busy signal control*

If a busy signal is received, means are provided for causing that customer's card to move to the next position, other apparatus being put into operation, causing certain apertures to be punched in the auxiliary tape 161 for controlling the recording when the tapes 160 and 161 are reversed to bring the unrecorded cards into recording position.

Assuming that a busy signal is received the automatic dialer cannot make a connection. Contact XT1 of Figure 33 was closed when relay XT of Figure 19 is energized. T7 and T9 are closed inasmuch as photocell T is exposed to light through slit 173, causing relay T' to function. Contacts XT1 and T7 being closed, the synchronous timer motor TC is set into operation and will eventually close contact TC1, energizing the coil RS. This causes the contact RS2 to be closed as previously described to energize forward relay 1M to function, closing contacts 1M1 and 1M2, causing motor 164 to rotate the reels 163 and 162 to cause the next card to come into position.

In Figure 31 I show a device for recording unrecorded cards and for preparing the card strip to return the unrecorded card to recording position. However, contact TC2 of Figure 31 is also closed by timer TC, and contact TC3 of Figure 33 is opened. As a result coil 206 of Figure 31 is operated to operate the stepper arm 204, cooperating with the gear 203 for driving the reel 200 from which the tape 208 is wound as well as operating the belt 202 to cause rotation of the wheel 201 on which tape 208 is wound. This tape is for the purpose of recording the number of unrecorded calls and also to cause operation of a punching device which provides apertures in the tape 161 of Figures 21, 22 and 23 for controlling later operation of the motor 164 to return the unrecorded card to recording position. This is accomplished by means of the cam 209 provided with teeth 210 for opening and closing the contacts H mounted on the contact arms 212 and 213. When the contact H is closed it completes a circuit through the coil 217 of Figure 34 the coil 217 operating the pivoted arm 217' to move the hole punching elements 218 and 218' to punching position and provide apertures 174 and 177 on tape 161, Figure 23, which cooperate with the relays PF and PR of Figures 28 and 29 in a manner to be later described. Thus the card is prepared for later recording.

As shown in Figure 32, tape 208 is provided with aperture 215, which initially registers with the light source 214 (Figure 31) and photocell CA (Figures 31 and 36).

This energizes photocell CA' of Figure 25 and maintains relay CA'' energized and contact CA1 of Figure 33 open so that relay S cannot be energized.

At the same time that the tape 208 is moved forward, it brings slit 215 out of line with the light source 214 and photocell CA' shown in Figures 25 and 30. This causes de-energization of the relay coil CA'', causing the contact CA1 of Figure 33 to open.

For each uncompleted call the stepper shown in Figure 31 steps one notch, moving the slit 215 that much farther from the light source 214. Each time the stepper, Figure 31, operates, the relay coil 217 of Figure 34 is energized to punch the cards with the apertures corresponding to apertures 174 and 177.

*Reverse winding*

The operations continue, the recording thereon taking place or the action taking place above described when a busy signal is received. When the end of the reel is reached, slit 171, Figure 23, registers with photocell R, Figure 22. This causes energization of the relay coil R', Figure 30, causing opening of all the closed F contacts and closing. The following action results: Contact R1 of Figure 28 closes, which is in the circuit of the photocell PR. Contact R2 of Figure 29 closes, which is in the circuit of photocell LR. The contact R3 in the circuit shown in Figure 33 closes, which is in the circuit of the relay coil S1T. Since CA1, Figure 33, is open coil S cannot be energized. Contact R4 closes, Figure 33, which is in the circuit of the relay circuit coil RE. Contact R5, Figure 33, closes, which is in the circuit of reverse coil of relay 2M. As a result relay coil 2M is energized, causing reversal of the driving motor 164, T3 being closed since slit 173 is not under photocell T for energizing relay coil T'. Thus contact T3 is also closed. The circuit is from the positive side of the line, contact T3, reverse relay coil 2M, contact R5 to the negative side of the line.

Since the uncompleted cards will be far apart it will be desirable to speed up operation of the motor 164. When coil RE became energized, contact RE1 closed, providing a holding circuit around R4. Contact RE2, Figure 33, closed a circuit through the relay coil RX, closing other contacts to be described. Contact RE3, Figure 33, closed, taking out the resistance 164' in the motor circuit, thus causing the motor to speed up. Contact RE4 closed, placing more resistance in the motor field MF, thus further increasing the speed of the motor. Since RE9 was opened the path will be through RE4. Contact RE5, Figure 28, closed placing photocell PR in condition for operation. Contact RE6, Figure 29, closed, placing photocell LR in condition for energization and operation of the amplifier circuit controlling relay coil LU'. Contact RE7 (Figure 24) opened. RE8 opened the circuit in Figure 21 to the stepper contact coil 206. The purpose of taking out the photocell T is to prevent the operation of the T contacts and to permit the master relay T' to be transferred to the relay RE just described.

Thus the initial stopping action is transferred from photocell T of Figure 24 to photocells PR or PF of Figure 28 (depending on direction during re-dialing), operating relay PFR' which cooperates with the apertures 177 and 174 respectively in a manner to be described. These photocells are located in the position above the auxiliary ribbon 161 for this purpose so that when the holes register with the photocells they will initiate stopping at the uncompleted-call cards.

The reel now moves in the reverse direction and the motor 164 will stop when the first uncompleted card reaches a position such that the aperture 177 registers with the photocell PR. This causes the relay PFR' of Figure 28 to be energized, R1 and RE5 being closed. As a result relay coil RT of Figure 33 is energized when PFR1 closes, closing contact RT1, forming a holding circuit around contact PFR1. Contact RT2 also closes in Figure 24 putting the phototube T back in condition for operation when the photocell T is exposed to light through the slit 173. When this occurs the relay T' functions to close contacts T5 of Figure 26 and T6 of Figure 27, thus putting the centering photocells IR and IF back in condition for operation to properly center the card as described above. From this point on the dialing and recording of the card is the same as in the previous operations.

When the coil is completed, the recorded mechanism shown in Figures 16 and 17 returns to initial position. This closes contact 1M, energizing X2 of Figure 19 and closing contact XT1' of Figure 33, contact RE having previously been closed when relay RE was energized. Thus a circuit is completed through relay RX energizing the same. Contact RX1 of Figure 31 is closed energizing coil 207, causing stepping arm 205 to rotate reel 200 in the reverse direction to bring the slit 215 back one position. At the same time the contact H, Figures 31 and 34, are closed and inasmuch as contact RE4' of Figure 35 has been previously closed, solenoid 215 is energized operating the lever 215' for causing puncher 216, 216' to function. This operation perforates apertures 175 and 176 as disclosed in Figure 23 for cooperating with phototubes LF and LR to prevent stopping of the apparatus at this card again when the reel is rotated in either direction in a manner to be described. Since RE3', Figure 34, is opened, solenoid 217 is prevented from picking up.

In case the call is not completed, nothing would have happened except that the synchronous timer TC, Figure 33, would have closed its contacts as before described and would start the reels again bringing the next uncompleted card into the machine, R5 of Figure 33 being closed due to the latch operation. Since T', Figure 24, is held in by contact RT2 of relay RT, Figure 33, it is only necessary to drop this relay RT and open contact RT2 which de-energizes T', Figure 24. With T' de-energized, T3, Figure 33, closes and completes the 2M circuit through R5. RT drops out when TC3 or RS5 opens. TC3 is opened when timer motor TC runs out, this contact being controlled by timer motor.

The above operation is continued until the strip has completely passed in a reverse direction over the light housing. Each time a call is completed on an uncompleted card, apertures 175 and 176 are made. Likewise the slit 215 in the ribbon 208 moves back one step toward the light source 214 and the photocell CA'.

If when the end of the reel is reached all of the calls have not been completed slit 215 will not register with photocell CA' and relay CA'' will remain un-energized. Since the relay contact CA1 of the circuit 33 is not closed, it will not energize the relay coil S and contacts S1 and S2, S3 and S4, Figure 33, will remain closed. The result is that slit 179 of Figure 23 again registers with photocell F to start rotation of the strip 160 in the forward direction. The F contacts operate the same as described before with the exception that, since RE5, RE6 are closed, and F2 and F3 of Figures 26 and 27 are closed, while R1 and R2 are open, photocells PF, Figure 28, and LF, Figure 29, are in position to be energized by apertures 174 and 175 respectively.

When a card is reached on which the call has been uncompleted and which was made complete on the first try, the two extra holes or apertures 175 or 176 will cause phototube LF or LR (depending on direction of run) of Figure 29 to become energized, energizing relay LU' and opening contact LU1, Figure 28, thus preventing operation of the coil PFR' and stopping of the motor 164, it being understood at this time that the contacts RE6 and F3 are closed and contact R2 open. When travelling in the reverse direction contact R2 is closed and F3 open. Thus again coil LU' is energized, keeping contact LU1 of Figure 28 open so that neither PR or PF can function to stop the motor. Thus when redialing is tried a second time no stop occurs at cards which have been completed. However if holes 175 and 176 are not perforated, contact LU1 remains closed so that either phototube PF or PR (depending on direction of run) will control relay PFR' when registering with the apertures 174 or 177 (depending on direction of run). Thus the reel will go back and forth until all cards are completed, after which photocell CA becomes activated, since it again registers with light source 214, to energize relay coil CA'', closing contact CA1 (Figure 33) and completing a circuit through the relay coil S, opening up contacts S1 and S2 and S3 and S4 and stopping further operation of the equipment.

For a further explanation of what occurs in a motor circuit, reference may be had to the following detailed description:

The speed of the motor is controlled by both the field and armature voltage. When all the cards are being read consecutively the motor field MF is operated at tap T2, Figure 33. Before coming to a complete stop at a card the motor is slowed down by changing field taps to T1, IF1 and IR1. At the final stop the motor field is made stronger by eliminating more resistance through contact IF2 or IR2. With a strong field the dynamic braking is effective so as to prevent "hunting" during positioning of the card.

During re-dialing the motor speed should be high, the field is made weak by inserting resistance by closing the RE4 contact and opening RE9. Also the armature resistance is cut out by a contact RE3. Stopping from this speed is done in two steps.

Assuming that the reel is moving in the forward direction, 80T is picked up through contact F4. Now suppose all the calls have been completed, then it is desired to stop the operation at the end of the reel. When the reel reaches the end, photocell R, Figure 30, picks up relay R' and operates its contacts. R3 closes and picks up 81T, Figure 33. For a short interval, 80T and 81T are both picked up, since 80T and 81T are time relays and 80T hasn't timed out yet. Now if the calls are completed photocell CA' is energized and closes the contact CA1 in the stopping circuit. The circuit 80T, 81T, CA1 is completed and the stopping relay S picks up opening contacts S1, S2, S3, S4. When S3, Figure 33, opens, ST deenergizes and contact ST2 opens, de-energizing all circuits in Figure 33. After a short time S drops out.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A meter for reading quantities, solenoid operated indicating devices associated with said meter and operable to positions determined by the reading of said meter, a recorder associated with said indicating devices, means associated with said recorder for sending electrical impulses of different frequencies to said indicating device, said indicating devices having means for causing pulses of said different frequencies to be returned to said recorder, said recorder having devices for printing upon a strip received intelligence in the form of pulses from said indicating devices.

2. A meter for reading quantities, solenoid operated indicating devices associated with said meter and operable to positions determined by the reading of said meter, a recorder associated with said indicating devices, means associated with said recorder for sending electrical impulses of different frequencies to said indicating devices, said indicating devices having intermittent circuit opening and closing cam operated switches for sending electrical pulses of said different frequencies from said indicating devices to said recorder in accordance with the opening and closing of said switches.

3. Apparatus for automatically recording meter readings of a station at a distance and including recording means, means associated with the meter to be read for automatically indicating the readings of said meter, said last means comprising a switch biased to open position, a cam cooperating with said switch for closing said switch a plurality of times, an electromagnetic device for rotating said cam, means associated with said electromagnetic device for limiting the movement of said device determined by the reading of a dial on said meter whereby a predetermined number of pulses corresponding to said dial reading are directed back to said recording means.

4. An apparatus for automatically recording meter readings at a distance and adapted to be used with a telephone line, including an automatic dialing mechanism and a recording means, said dialing mechanism automatically connecting said recording means to a subscriber's station, said last action being controlled by a prepared record strip passing into said automatic dialing mechanism, and means at said subscriber's station for recording intelligence and transferring said intelligence back to said recording means, and other means associated with both of said recording means for electrically causing intelligence to be transferred from the recording means at said subscriber's station to the recording means at said automatic dialer, said automatic dialing and recording means for recording intelligence at a distance including a light housing having a transparent supporting surface, a continuous strip mounted to pass over said surface and provided with a plurality of successively positioned preselected apertures, a movable photocell housing positioned above said strip and housing and provided with a plurality of photocells selectively associated with said apertures, and other means for successively placing said photocells in condition for energization, means associated with said photocells including control circuits for causing movement of said photocell housing over said strip and having means for successively generating a series of pulses in predetermined sequence for connecting said dialing mechanism and recording means through a central office to a subscriber's line.

5. An apparatus for automatically recording meter readings at a distance and adapted to be used with a telephone line, including an automatic dialing mechanism and a recording means, said dialing mechanism automatically connecting said recording means to a subscriber's station, said last action being controlled by the insertion of a prepared record strip into said automatic dialing mechanism, and means at said subscriber's station for recording intelligence and transferring said intelligence back to said recording means, and other means associated with both of said recording means for electrically causing intelligence to be transferred from the recording means at said subscriber's station to the recording means at said automatic dialer, said automatic dialing and recording means for recording intelligence at a distance including a light housing having a transparent supporting surface, a continuous strip mounted to pass over said surface and provided with a plurality of successively positioned preselected apertures, a movable photocell housing positioned above said strip and housing and provided with a plurality of photocells selectively associated with said apertures, and other means for successively placing said photocells in condition for energization, means associated with said movable photocell housing and said photocells including control circuits for causing movement of said photocell housing over said strip and having means for successively generating a series of pulses in predetermined sequences for connecting said dialing mechanism and recording means through a central office to a subscriber's line, means associated with said dialing mechanism for causing movement of said strip to the next position upon receiving a busy signal, and other means for perforating said strip for controlling return movement of said strip to bring the unrecorded portion of said strip to recording position repeatedly until a connection can be made to a subscriber's station.

6. Apparatus for recording intelligence at a distance and including a housing having a light source therein, a supporting member supported on said housing and having a transparent portion through which light from said light source is directed, a recording device movable toward and from said supporting member, a device for generating electrical pulses at a plurality of different frequencies, an indicating mechanism located at a distance, automatic reading mechanism connected with said indicating mechanism, electrical connections between said generating device, said reading mechanism and said recording device, whereby said reading mechanism in response to pulses at one of said frequencies will read said indicating mechanism and return pulses of other different frequencies in accordance with the reading on said indicating mechanism to said recording device to cause said recording device to record and to move toward said supporting member for recording purposes, and mechanism movable back and forth over said light housing and supporting a plurality of light responsive devices, and means on said supporting member for selectively permitting light from said light source to fall on said light responsive devices to energize the same, means electrically connected to and controlled by the light responsive devices for controlling movement of said movable mechanism and for automatically connecting said generating device, reading mechanism and recording mechanism together.

7. A telemetering system including a metering device having a plurality of indicating means thereon, a pulser associated with each of said indicating means including a cam mechanism and a switch associated therewith connected to each of said indicating means, a recorder at a recording station and means associated therewith for generating electrical pulses at a plurality of different frequencies, electrical connections between said recorder and said pulse generating means, and other electrical connections between said pulse generating means and said recorder and said pulsers at said metering device, filters arranged at said generating means and at said metering device for permitting only pulses of a single frequency to pass through each pulser at said metering device to said recorder, and a separate means responsive to a single frequency for connecting said pulsers at said metering device with said recorder and automatic means responsive to a prepared strip for controlling connection of said recorder and pulse generating means to said pulsers at said meter, said pulses being sent and received over a single pair of conductors between said recorder and said pulsers.

8. A telemetering system including a metering device having a plurality of indicating means thereon, a pulser associated with each of said indicating means including a cam mechanism and a switch associated therewith connected to each of said indicating means for operating said switch a number of times in accordance with the reading on said indicating means, a recorder at a recording station and means associated therewith for generating electrical pulses at a plurality of different frequencies, electrical connections between said recorder and said pulse generating means, and other electrical connections between said pulse generating means and said recorder and said pulsers at said metering device, and filters at said generating means and at said metering device for permitting only a single frequency to pass through each pulser at said meter to said recorder, and separate means responsive to a single frequency for connecting said pulsers at said metering device with said recorder, and automatic means for controlling connection of said recorder at said pulsers at said metering device.

9. A telemetering system including a metering device having a plurality of indicating means thereon, a pulser associated with each of said indicating means including a cam mechanism and a switch associated therewith connected to each of said indicating means, and means for operating said cam mechanism and switches in accordance with the reading on said indicating means, a recorder at a recording station and means associated therewith for generating electrical pulses at a plurality of different frequencies and electrical connections between said recorder and said pulse generating means, and other electrical connections between said pulse generating means and said recorder and said pulsers at said metering device, and filters at said generating means and at said metering device for permitting only a single frequency to pass through each pulser at said meter to said recorder, and a separate means responsive to a single frequency for connecting said pulsers and means for operating said pulsers with said recorder, said recorder having a separate recording mechanism for each indicating means and responsive to pulses at only a single frequency associated with the pulser connected to the single indicating means.

10. Apparatus for recording intelligence at a distance over telephone wires, and including a housing having a light source therein, a supporting member supported on said housing and having a transparent portion through which light from said light source is directed, a recording device movable toward and from said supporting member, a device for generating electrical pulses at a plurality of different frequencies, an indicating mechanism located at a distance, automatic reading mechanism connected with said indicating mechanism, electrical connections between said generating device, said reading mechanism and said recording device whereby said reading mechanism in response to pulses at one of said frequencies will read said indicating mechanism and return pulses of said other different frequencies in accordance with the reading on said indicating mechanism to said recording device to cause said recording device to record and to move toward said supporting member for recording purposes, and mechanism movable back and forth over said light housing and supporting a plurality of light responsive devices, and means on said supporting member for selectively permitting light from said light source to fall on said light responsive devices to energize the same, means electrically connected to and controlled by the light responsive devices for controlling movement of said movable mechanism and an automatic dialer connected to said movable mechanism for automatically connecting said generating device, reading device and recording mechanism together through said telephone wires.

11. Apparatus for recording intelligence over telephone wires from a station at a distance and including a light housing having a light source therein, an automatic dialing means including a movable housing carrying a plurality of photocells movable over said light housing and a recording device movable toward and from said light housing, said light housing being adapted to receive an apertured control strip thereon for selectively permitting light from said light source to shine on said photocell to cause operation of said dialing means, a device for generating electrical impulses of different frequencies, automatic reading mechanism associated with an indicating mechanism located at the distant station and connected to be responsive to said device for generating electrical impulses, said automatic dialing means having means for connecting said recording device and said device for generating electrical impulses to said automatic reading mechanism, and means connected to said reading mechanism and said pulse generating means for transmitting intelligence as pulses of said plurality of frequencies from said automatic reading mechanism to said recording device for causing said recording device to imprint the received intelligence on said control strip.

12. In combination a meter having a plurality of dials thereon indicating measured quantities, a rack and gear associated with each of said dials and solenoid means for operating said rack and gear mechanism, means associated with said dial and rack and gear mechanism for limiting rotation of said gear in accordance with the reading on its respective dial, a switch for each dial biased to open position, a cam associated with each gear and having cam surfaces for intermittently contacting the switch associated therewith, a recording device associated with said meter and means for automatically connecting said recording device and said switches, electrical pulse generating means for generating pulses at a plurality of frequencies, filtering means connected to said pulse generating means and associated with each of said switches for passing only one of said frequencies, whereby each switch is associated with only one of said pulse generating means, the closing of a switch by its cam sending a pulse of a predetermined frequency to said recording device for causing operation of said recording device in accordance with the reading of said dial meters.

13. In combination a meter having a plurality of dials thereon indicating measured quantities, a rack and gear associated with each of said dials and solenoid means for operating said rack and gear mechanism, means associated with said dial and rack and gear mechanism for limiting rotation of said gear in accordance with the reading on its respective dial, a switch for each dial biased to open position, a cam associated with each gear and having cam surfaces for intermittently contacting the switch associated therewith, a recording device associated with said meter and means for automatically connecting said recording device and said switches, electrical pulse generating means for generating pulses at a plurality of frequencies, filtering means connected to said pulse generating means and associated with each of said switches for passing only one of said frequencies, whereby each switch is associated with only one of said pulse generating means, the closing of a switch by its cam sending a pulse of a predetermined frequency to said recording device for causing operation of said recording device in accordance with the reading of said dial meters, and means responsive to a single frequency for making connections between said switches, filtering means, pulse generating means and recording device.

HENRY C. SAVINO.

REFERENCES CITED

The following references are of record in the file of this patent:

UNITED STATES PATENTS

| Number | Name | Date |
|---|---|---|
| 784,712 | Thordarson | Mar. 14, 1905 |
| 1,244,634 | Neff et al. | Oct. 30, 1917 |
| 1,889,597 | Fitz Gerald | Nov. 29, 1932 |
| 1,955,043 | Yates | Apr. 17, 1934 |
| 2,044,470 | Devaux | June 16, 1936 |
| 2,111,154 | Nichols | Mar. 15, 1938 |
| 2,326,200 | Bristol | Aug. 10, 1943 |
| 2,393,021 | Cheek | Jan. 15, 1946 |
| 2,402,771 | Potts | June 25, 1946 |
| 2,419,487 | Dresser | Apr. 22, 1947 |
| 2,450,516 | Kinkead et al. | Oct. 5, 1948 |